United States Patent
Vo (10) Patent No.: US 9,393,698 B1
(45) Date of Patent: Jul. 19, 2016

(54) SELF-ASSISTING ROBOT AND METHOD FOR TRANSFERRING A PARAPLEGIC USER TO AND FROM A WHEEL CHAIR

(71) Applicant: Duy Hoang Vo, Ho Chi Minh (VN)

(72) Inventor: Duy Hoang Vo, Ho Chi Minh (VN)

(73) Assignee: Ton Duc Thang University, Ho Chi Minh (VN)

( * ) Notice: Subject to any disclaimer, the term of this patent is extended or adjusted under 35 U.S.C. 154(b) by 0 days.

(21) Appl. No.: 14/828,440

(22) Filed: Aug. 17, 2015

(51) Int. Cl.
| | |
|---|---|
| *B25J 11/00* | (2006.01) |
| *A61G 5/04* | (2013.01) |
| *B25J 5/00* | (2006.01) |
| *A61G 5/10* | (2006.01) |
| *A61G 5/14* | (2006.01) |
| *B60K 1/02* | (2006.01) |

(52) U.S. Cl.
CPC ............. *B25J 11/009* (2013.01); *A61G 5/04* (2013.01); *A61G 5/1075* (2013.01); *A61G 5/14* (2013.01); *B25J 5/007* (2013.01); *B60K 1/02* (2013.01); *Y10S 901/01* (2013.01)

(58) Field of Classification Search
CPC .......... B25J 11/009; B25J 5/007; B60K 1/02; A61G 5/1075; A61G 5/04; A61G 5/14; Y10S 901/01
See application file for complete search history.

(56) References Cited

U.S. PATENT DOCUMENTS

| | | | | |
|---|---|---|---|---|
| 5,368,362 | A * | 11/1994 | Ramon | ............... A61G 5/00 248/188.7 |
| 5,953,774 | A * | 9/1999 | Arndt | ............... A61G 7/1017 5/81.1 R |
| 2014/0289960 | A1* | 10/2014 | Hjort | ............... A61G 7/1019 5/83.1 |
| 2015/0342817 | A1* | 12/2015 | Gu | ............... B25J 11/009 601/24 |

* cited by examiner

*Primary Examiner* — Drew Brown (57) ABSTRACT

A self-assisting robot for assisting a paraplegic user is disclosed which comprises a platform having a plurality of wheels, a robotic arm, an inclination sensor, operable to measure the inclination angle formed between said platform and a road in front thereof, a saddle configured to be adjusted up and down to fit the height of a user, a controller panel connected to said saddle, a processor operable to control the operations of the self-assisting robot, and a kneeling seat connected to and move with the robotic arm.

21 Claims, 8 Drawing Sheets

SELF-ASSISTING ROBOT AND METHOD FOR TRANSFERRING A PARAPLEGIC USER TO AND FROM A WHEEL CHAIR

FIELD OF THE INVENTION

The present invention relates generally to the field of medical device. More specifically, the present invention relates to a robot that assists a user to transfer from a wheel chair to another location and vice versa.

BACKGROUND ART

There are three different types of devices that assist a user from a wheel chair. The first type is the simple mechanical type without any automatic mechanism to assist the transferring of the user to and from the wheel chair that needs the assistance of a nurse to transfer the user from a wheel chair. The second type is the semi-automatic device that still needs some human assistance. The third type is the fully automatic device that does not need the assistance of a nurse.

It is easy to understand that the first type of user transfer device is inconvenient for both the user and a nurse because the user needs complete assistance from the nurse. Furthermore, to reduce the human assistance in the first type of user transfer device, either a specially designed toilet (self-rotating toilet seat) or a user lift hanging from the ceiling needs to be deployed. These types of devices increase costs and still require full assistance from a nurse.

In the semi-automatic user transfer devices, a special cart is provided just to move a user to and from a toilet seat. At the toilet seat or the wheel chair, a nurse needs to present in order to move the user onto the toilet seat or back to the wheel chair. These devices cost money and still require human labor.

Finally, in the conventional automatic user transfer devices such as the self-transfer aid robotics by Yoshihiko Takahashi. Even though the robotic eliminates assistance from a nurse, it is still not preferred by users for the reasons discussed below.

Figure 1:
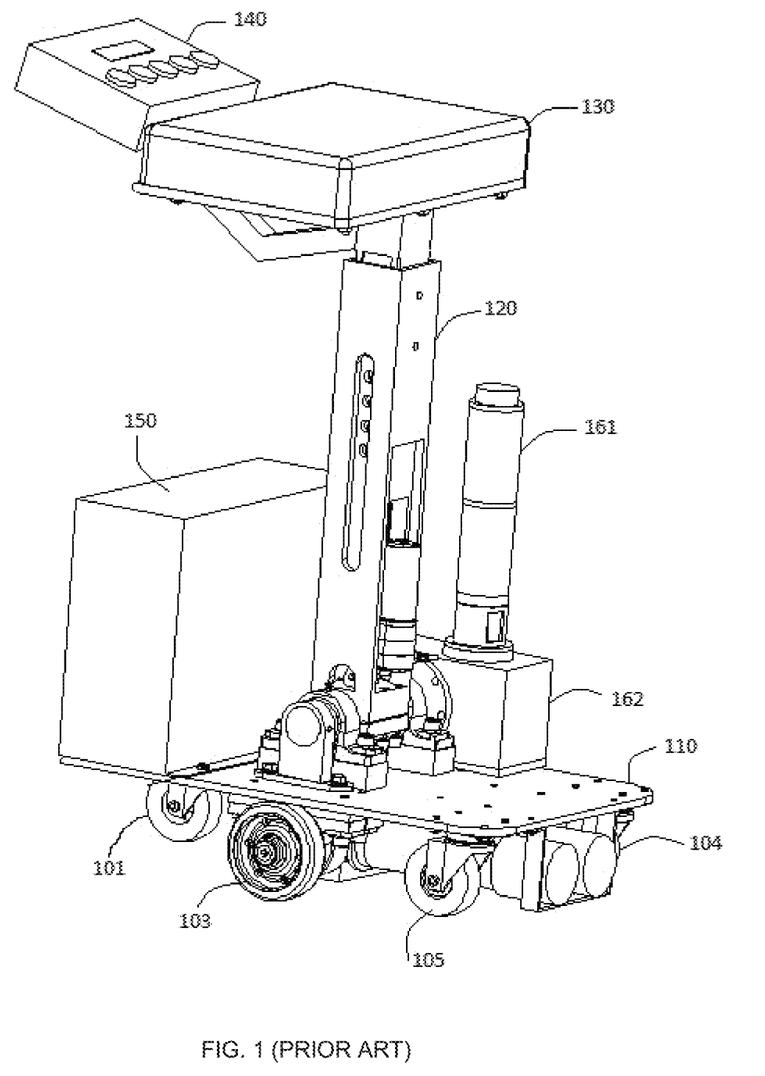
FIG. 1 is a diagram illustrating an example of one of the prior art devices (Takahashi self-transfer aid robotics) designed to assist transferring a user from a wheel chair to a toilet and vice versa.

Now referring to FIG. 1, a prior-art Y. Takahashi self-transfer aid robotics 100 (hereinafter referred to as robotics 100) is illustrated. Robotics 100 includes a platform 110 with wheels 103-104 connected on the lower side, a robotic arm 120 connected to the upper side of the platform 110. A saddle 130 is placed on top of robotic arm 120. A control panel 140 is originated from robotic arm 120 so that a user can control robotics 100. In robotics 100, a worm gear 162 and 163 are used to incline or decline robotic arm 120. A worm gear motor 161 is used to control worm gear 162-163.

In use, when arriving at the user's location, robotic arm 120 and saddle 130 leans forward toward the user. Next, the user puts all of his or her weight onto saddle 130 in order to move away from the wheel chair. Then, the conventional self-transfer robotics 100 re-erects robotic arm 120 to the vertical position. Finally, robotic 100 rotates the user (while the user is hanging on saddle 130) and moves the user to another location, i.e., a toilet.

Continuing with FIG. 1, in self-transfer aid robotics 100, the user puts all his or her weight onto saddle 130. This causes great discomfort to the user. This is especially true when the user does not have any lower body strength. In addition, robotics 100 lacks safety in that it does not have inclination detector to detect the inclination between itself and the ground. When moving through steep ramps, robotics 100 can lose balance and topple, causing great danger to the user.

Another problem of robotics 100 is that it lacks adaptability. In other words, robotics 100 cannot measure the height of the location where the user sits. For example, if the user sits on a high chair or a high level bed, or a high table surface, robotics 100 cannot adjust itself to help the user.

Still referring to the discussion of FIG. 1, yet another problem of robotics 100 is that when the user is home alone and when robotics 100 is far away from the user, it is stressful for the user to move toward robotics 100.

Therefore what is needed is a user lift that can overcome the above described problems.

SUMMARY OF THE INVENTION

Accordingly, an objective of the present invention is to provide a self-assisting robot for assisting a paraplegic user is disclosed which comprises a platform having a plurality of wheels, a robotic arm, an inclination sensor, operable to measure the inclination angle formed between said platform and a road in front thereof, a saddle configured to be adjusted up and down to fit the height of a user, a controller panel connected to the saddle, a processor operable to control the operations of the self-assisting robot, and a kneeling seat connected to and move with the robotic arm.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 2:
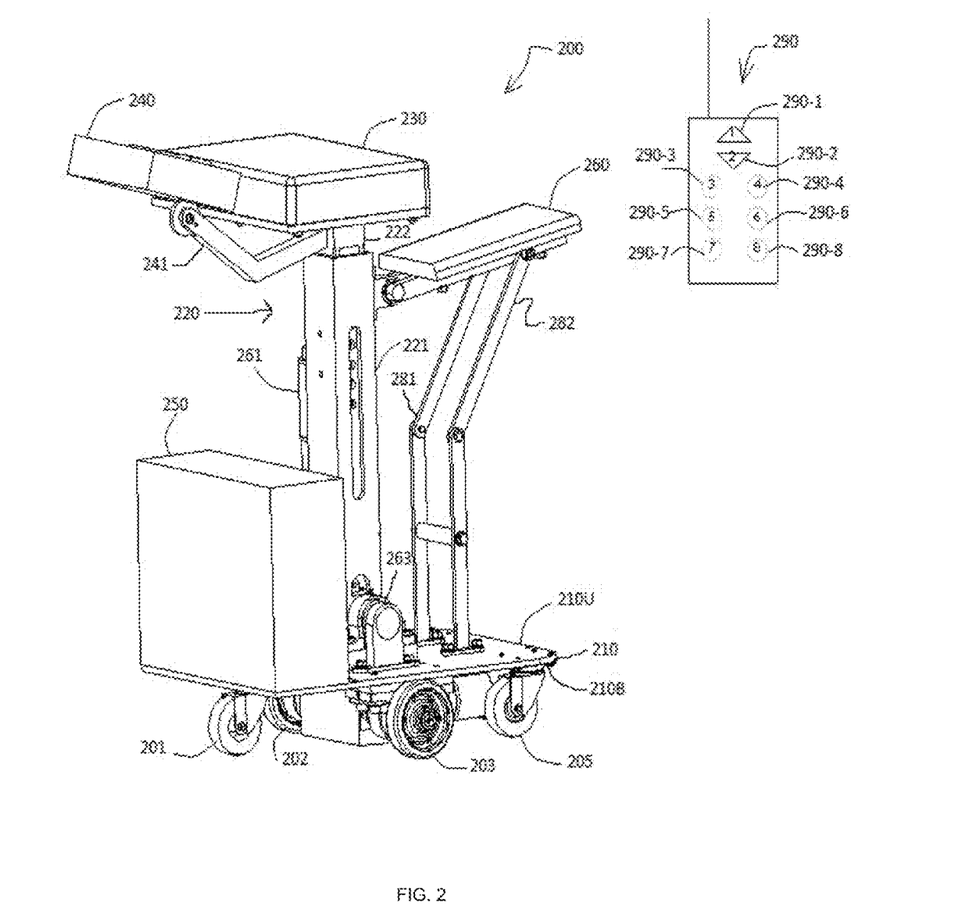
FIG. 2 is a diagram illustrating a self-assisting robot for transferring a user from a wheel chair to another location and vice versa in accordance with an embodiment of the present invention.

One embodiment of the invention is now described with reference to FIGS. 2 to 6. FIG. 2 shows an embodiment of a self-assisting robot 200 of the present invention. Self-assisting robot 200 includes a platform 210 having a top side 210U and a bottom side 210B. A first caster wheel 201, a second wheel 202, a third wheel 203, a fourth caster wheel 204, and a fifth caster wheel 205 are all mechanically connected to the bottom side 210B of platform 210. In one embodiment of the present invention, second wheel 202 and third wheel 203 are not caster wheels. A first motor 207 and a second motor 208 (not seen in FIG. 1, please refer to FIG. 6) are connected to second wheel 202 and third wheel 203 respectively. First motor 207 and second motor 208 are independently operated so that self-assisting robot 200 is capable of moving forward, backward, turning left, or turning right.

Continuing with FIG. 2, on top side 210U of platform 210, a robotic arm 220 is connected to a worm gear assembly 260. A kneeling seat 280 coupled to two bendable legs 281 and 282 is also connected and move with robotic arm 220. In one embodiment of the present invention, a fourth motor 270 (not shown in FIG. 2, please refer to FIG. 3) is connected to extend or withdraw robotic arm 220 vertically to bring the top surface of saddle 230 to the height level of the user's seat. Finally, a processor box 250 is connected first motor 207, second motor 208, third motor 261, and fourth motor 270. Third motor 261 is dedicated to drive worm gear assembly 260.

Continuing with FIG. 2, robotic arm 220 further includes a fixed part 221 containing a moving part 222. In other words, moving part 222 is inserted to move freely inside fixed part 221. The bottom section of moving part 222 is connected to fourth motor 270. The top of moving part 222 is connected to a saddle 230 and a control panel 240. More specifically, control panel 240 is positioned on an arm 241 extended outward from moving part 222. In one embodiment, extending arm 241 is adjustable up or down in order to provide complete assistance to the user without the help of a nurse.

Still continuing with FIG. 2, in one embodiment, a remote controller 290 is used to control self-assisting robotic 220. Remote controller 290 controls self-assisting robot 200 which includes a moving forward button 290-1, a moving backward 290-2, a turning left button 290-3, a turning right button 290-4, an extending button 290-5, a withdrawing button 290-6, a restoring button 290-7, and an inclining button 290-8.

Figure 3:
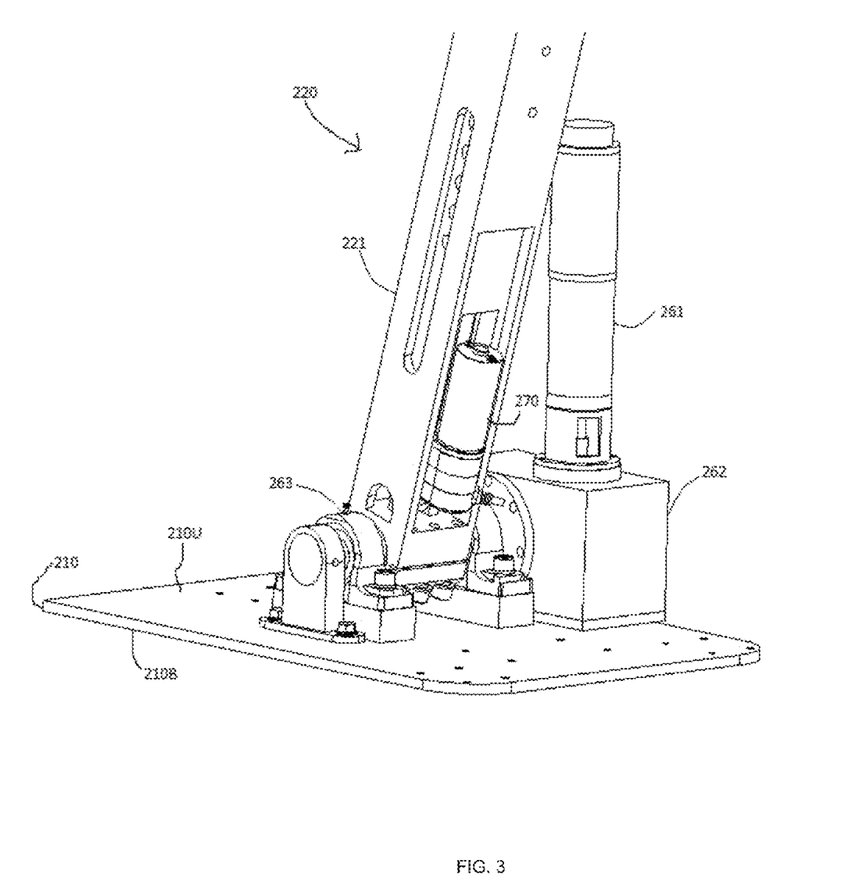
FIG. 3 is a diagram illustrating a worm gear in connection with a robotic arm used in the self-assisting robot in accordance with an embodiment of the present invention.
Figure 4:
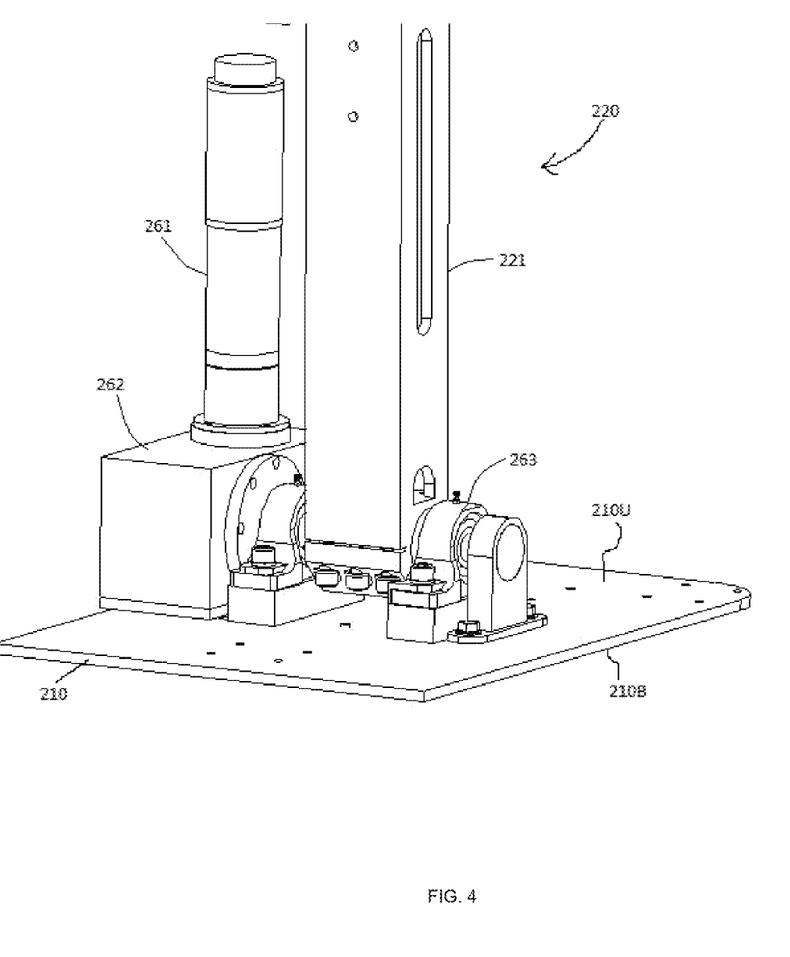
FIG. 4 is a diagram illustrating a platform, a worm gear, and the base of the robotic arm in accordance with an embodiment of the present invention.

Now referring next to FIG. 3 and FIG. 4, worm gear assembly 260 operative to cause robotic arm 220 to incline forward or backward is illustrated. FIG. 3 shows the front side of worm gear assembly 260 while FIG. 4 shows the back side. Worm gear assembly 260 further includes third motor 261 for driving a worm screw contained in box 262 and a worm wheel 263. Worm wheel assembly 260 is well known in the art; therefore, the detailed description of worm gear assembly 260 is not discussed here. In one embodiment, third motor 261 is a 24 VDC linear motor which has a reduction ratio of 1/150 and a rated torque of 98 kgf-cm.

Figure 5:
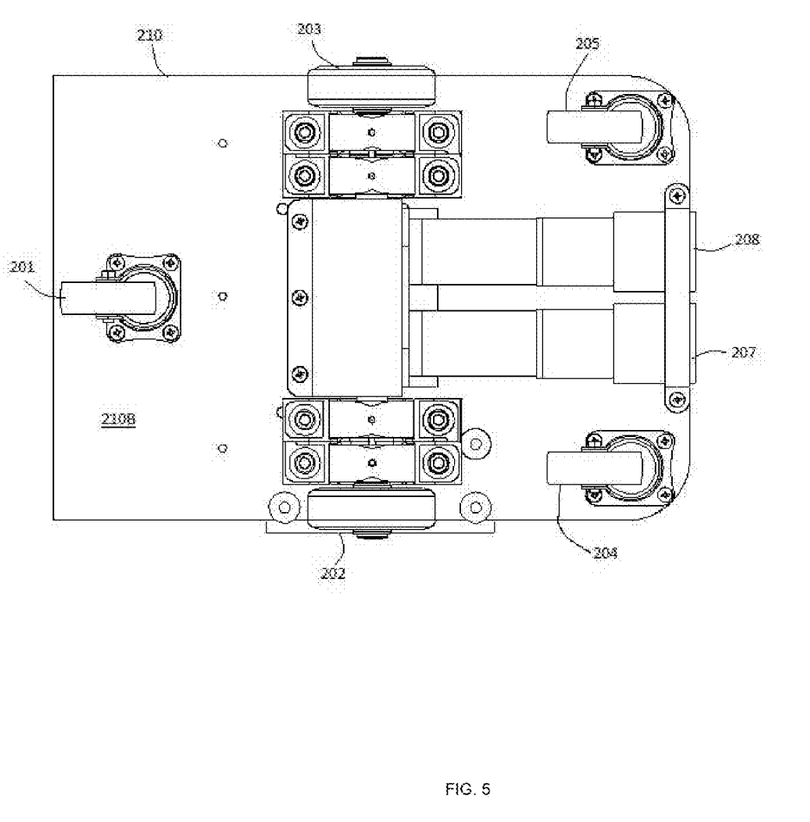
FIG. 5. is a diagram illustrating all the wheels located on the bottom side of the platform of the self-assisting robot in accordance with an embodiment of the present invention.

Next, FIG. 5 illustrates bottom side 210B of platform 210 where wheels 201-205, first motor 207, and second motor 208 are located. First motor 207 and second motor 208 are operated independently so that self-assisting robot 200 can turn left, right, forward, and backward. In one embodiment of the present invention, first motor 207 and second motor 208 are 24 VDC motor with a rated moment of 100 kgf-cm and gear reduction ratio of 1/546. First motor 207 and second motor are controlled by control panel 240 and remote controller 290.

Figure 6:
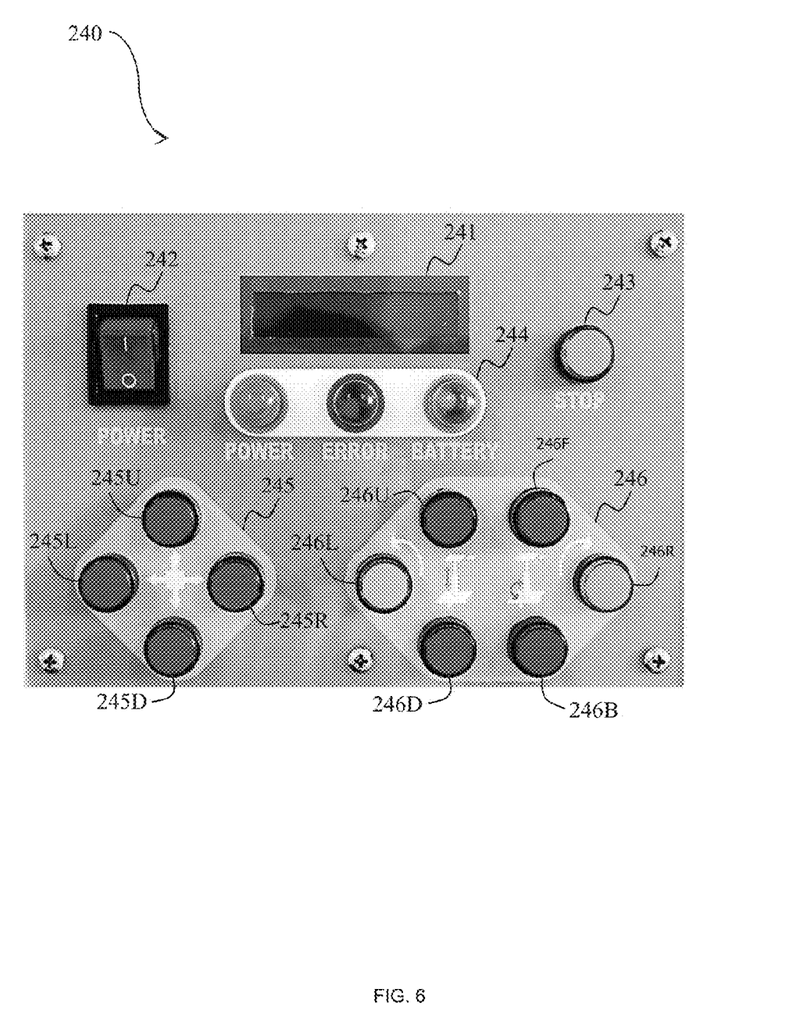
FIG. 6 illustrates the control panel of the self-assisting robot in accordance with an embodiment of the present invention.

Now referring to FIG. 6, the layout of control panel 240 is illustrated. Control panel 240 includes a power switch 242 where the user can turn on and turn of all motors 207, 208, 261, and 270. A display unit 244 is used to inform a user whether a battery is low, the power is on or off, or any problem with the motors 207, 208, 261, and 270. A stop button 243 is used to manually stop self-assisting motor 200 when the user either changes his/her mind or when a buzzer alarms the user of steep inclination ahead. Section 245 is dedicated to the controls of second wheel 202 and third wheel 203 via first motor 207 and second motor 208 respectively. Section 245 includes a forward button 245U, a backward button 245D, turning left button 245L, and turning right button 245R. Varying the power to first motor 207 with respect to second motor 208 causes self-assisting robot 200 to turn either left or right.

Continuing with FIG. 6, section 246 is dedicated to control robotic arm 220. Section 246 includes an inclining forward (toward the user) button 246R, an restoring (back to the initial position) button 246L, an extending button 246U for rising robotic arm 220 higher, a withdrawing button 246D for withdrawing robotic arm 220 toward platform 210, a turning left button 246F for turning robotic arm 220.

Figure 7:
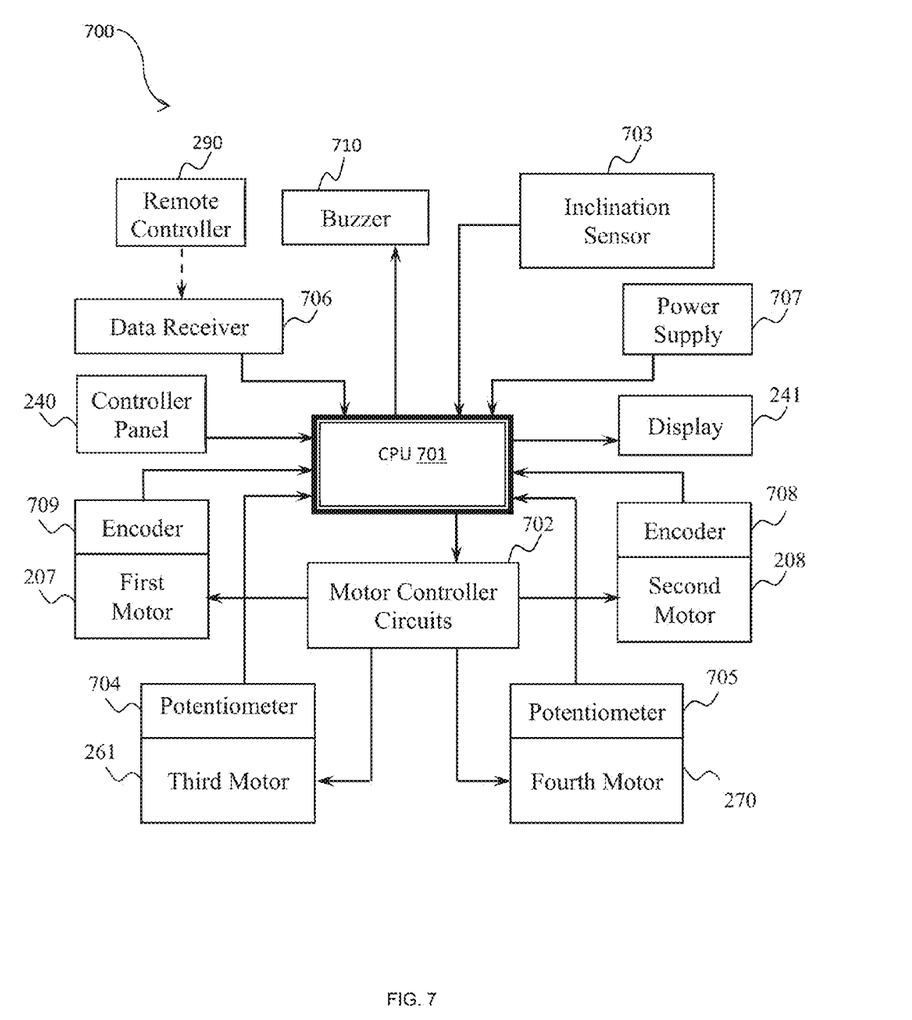
FIG. 7 illustrates a system level diagram inside the processor of the self-assisting robot is accordance with an embodiment of the present invention.

Referring next to FIG. 7, FIG. 7 illustrates a schematic diagram 700 of the hardware implementation of control panel 240. A central processing unit (CPU) 701 is connected to provide control of self-assertive robot 200 via control panel 240. In addition, CPU 701 communicates to a motor controller circuit 702. As its name suggests, motor controller circuit 702 controls all four motors 207, 208, 261, and 270. A first potentiometer 704 senses how far robotic arm 220 needs to incline in order to accommodate to the user. Then, first potentiometer 704 sends the distance information to CPU 701. A second potentiometer 705 senses the height of the user's seat and sends this information to CPU 701. An inclination sensor 703 senses the angle between platform 210 and the ground surface whereupon self-assisting robot 200 is moving. As mentioned above, if this angle is too steep, CPU 701 sends a signal to sound a buzzer 710. Buzzer 710 emits a loud audio signal in order to warn the user. In the automatic mode, CPU 701 also automatically stops self-assisting robot 200. A power supply 707 provides the necessary voltages to CPU 701.

Continuing with FIG. 7, in one embodiment of the present invention, self-assisting robot 200 is capable of operating in either manual mode via control panel 240 or remote controller 290 as discussed in FIG. 2. A data receiver 706 receives wireless signals from remote controller 706 which, in turn, sends them to CPU 701. In the manual mode, the user controls the inclination degree and the extension of robotic arm 220. The user also stops self-assisting robot 200 when buzzer 710 sounds the alarming signals. In addition, the user moves and rotate self-assisting robot 200 by using either remote controller 290 or control panel 240.

Still continuing to FIG. 7, alternatively, self-assisting robot 200 can be operated by an automatic mode. In the automatic mode, CPU 701 automatically extends and inclines robotic arm 200. CPU 701 also retrieves robotic arms 220 and kneeling seat 280 after the user has transferred from the wheel chair (not shown) to kneeling seat 280. In the final phase, CPU 701 rotates self-assisting robot 200 to orient the user in a correct direction. After the structure of self-assisting robot 200 is described, the operation of self-assisting robot 200 is fully explained in FIG. 8.

Figure 8:
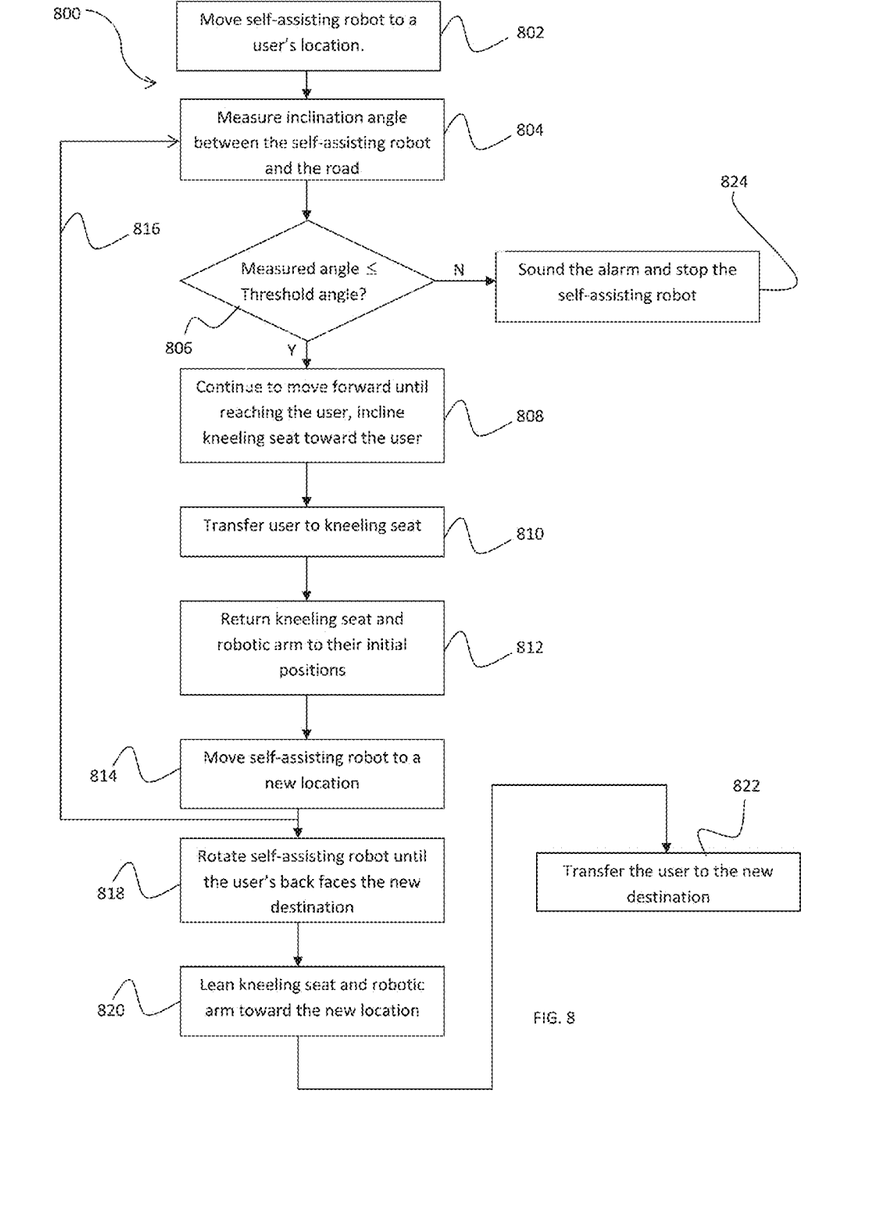
FIG. 8 is a flow chart illustrating method of using the self-assisting robot in accordance with an embodiment of the present invention.

Now referring to FIG. 8, a method 800 for operating self-assisting robot 200 described above is illustrated. In operation, self-assisting robot 200 is caused to move toward a user on a wheel chair by remote controller 290. When reaching the user, self-assisting robot 200 stops. Kneeling chair 280 and robotic arm 220 learn forward toward the user. The user then moves onto kneeling chair 280 by leaning on saddle 230. After a predetermined time, kneeling chair 280 and robotic arm 220 withdraw back to the initial position, pulling the user out of the wheel chair. At this moment, the user sits completely comfortable on kneeling chair 280. Next, self-robotic arm 280 rotates to orient the back of user toward the destination. Finally, self-assisting robot 200 moves forward the destination.

First, at step 802, moving self-assisting robot 200 toward a user and his/her wheel chair. In practice, step 802 is realized by first wheel 201, second wheel 202, third wheel 203, fourth wheel 204, fifth wheel 205, first motor 207, and second motor 208.

At step 804, the inclination angle of self-assisting robot is measured. Step 804 is realized by inclination sensor 703 and CPU 701.

Next at step 806, the measured inclination angle is compared with a threshold angle to determine whether the inclination angle is less than or equals to the threshold angle.

At step 808, if the inclination angle is less than or equals to the threshold angle, continue to move forward until reaching the user. Upon reaching the user, causing robotic arm 220 and kneeling chair 280 to learn forward the user. In practice, step 808 is realized by third motor 261 and first potentiometer 704. As mentioned above, first potentiometer 704 senses how far robotic arm 220 and kneeling seat 280 need to incline. Without first potentiometer 704, robotic arm 220 could either fail to incline forward far enough to reach the user, which is a defect of self-assisting robot 200. On the other hand, robotic arm 220 could incline too far, which could potentially cause harm to the user.

At step 810, the user is transferred onto a kneeling seat. More specifically, the user grasps and leans onto saddle 230 while transfers his or her weight onto kneeling seat 280. Without kneeling seat 280, all the pressure is put heavily on the user's chest. As a consequence, worm gear 260 is worn out quickly. Thus, adding and coupling kneeling seat 280 onto robotic arm 220 of the present invention provide great comforts to the user.

Following is step 812, after completely transferring the user to kneeling seat 280, robotic arm 220 is restored to its initial position, which is perpendicular to platform 210. As a result, the user is now sitting straight up in the normal sitting position.

At step 814, move self-assisting robot 200 and the user to a new destination. Within the scope of the present invention, new destination can be a toilet, another seat, a bed, a car, etc.

During moving to the next destination, step 816 constantly measures the inclination angle in order to present self-assisting robot 200 from being overturned due to steep surface such as staircase, a vertical step, or a cliff. At step 816, steps 804-808 are repeated and then step 816 jumps to step 818.

At step 818, upon reaching the destination, self-assisting robot 200 rotates by means of first motor 207 and second motor 208. Self-assisting robot 200 rotates until the user is oriented to the desired position relative to the new destination. In one embodiment, the new destination is a toilet seat, self-assisting robot 200 rotates so that the user's back faces the front of the toilet seat.

At step 820, robotic arm 220 and kneeling seat 280 are again inclined forward. Within the scope of step 820, second potentiometer 705 constantly measures and feedbacks how far robotic arm 220 and kneeling seat 280 need to incline forward.

At step 822, the user is transferred to the new destination.

Finally, at step 824, in case the inclination angle is greater than the safe threshold angle, CPU 701 causes buzzer 710 to alarm the user. The user either presses the stop button 243 or self-assisting robot 200 automatically stops for the user. The user then uses section 245 of control panel 240 to move self-assisting robot 200 away from steep inclination angle.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A self-assisting robot for assisting a paraplegic user, comprising:
   a platform having a first wheel, a second wheel, a third wheel, a fourth wheel, and a fifth wheel connected on the bottom side of said platform;
   a robotic arm, connected to said platform on the top side of said platform;
   an inclination sensor, connected to said robotic arm, operable to measure the inclination angle formed between said platform and a road in front thereof;
   a saddle connected to said robotic arm and configured to be adjusted up and down to fit with the height of a user;
   a controller panel connected to said saddle;
   a controller electrically connected to said controller panel and operable to control the operations of said self-assisting robot; and
   a kneeling seat connected to said robotic arm, operable to move with said robotic arm, wherein said controller box is configured to cause said saddle and said kneeling seat to lean toward a user when a first command is entered, to cause said saddle and said kneeling seat to rotate toward a toilet seat upon the execution of a second command or after a predetermined amount of time has passed, and to cause said saddle and said seat to return to an initial resting position.

2. The self-assisting robot of claim 1 further comprises a distance sensor connected to said robotic arm, operable to sense the distance between a wheel chair of said user and said self-assisting robot.

3. The self-assisting robot of claim 1 wherein said first wheel, said fourth wheel, and said fifth wheel are a caster wheel and wherein said first wheel is positioned in front of the bottom side of said platform, said fourth wheel and said fifth wheel are located in the rear of the bottom side of said platform.

4. The self-assisting robot of claim 1 wherein said second wheel and third wheel is connected to a first motor and said third wheel is connected to a second motor, both said first motor and said second motor are controlled by said controller.

5. The self-assisting robot of claim 1 wherein said saddle is configured to adjust to a maximum height of 80 cm.

6. The self-assisting robot of claim 1 wherein said platform has a width of 35 cm and a length of 50 cm.

7. The self-assisting robot of claim 1 wherein said kneeling seat has a front side connected to said robotic arm and bendable legs connected to said platform so that when said robotic arm leans forward to said user said kneeling seat is also bent forward to receive said user.

8. The self-assisting robot of claim 1 wherein said robotic arm further comprises a third motor configured to cause said robotic arm to incline toward said user.

9. The self-assisting robot of claim 8 wherein said third motor further comprises a DC motor and a worm gear.

10. The self-assisting robot of claim 9 wherein said third motor further comprises a potential meter configured to measure the height of the current location of said user.

11. The self-assisting robot of claim 10 wherein said saddle is connected to a fourth motor operable to raise and lower said saddle depending on the measurement from said potential meter.

12. The self-assisting robot of claim 1 wherein said robotic arm forms a 90 degrees with said platform at an initial rest position and a maximum inclination angle of 64 degrees toward said user with said platform.

13. The self-assisting robot of claim 1 further comprises a remote controller operable to control said self-assertive robot remotely in place of said control panel.

14. The self-assisting robot of claim 1 further comprises sensor for sensing the inclination angle of said self-assertive robot and the road, wherein said inclination sensor sends an alarm signal to said user if the detected inclination angle an inclination surpasses a safe threshold angle.

15. The self-assisting robot of claim 1 further comprising a sleep mode detector, electrically connected to said processor, operable to detect when said self-assisting robot are in a rest mode and turn off a power supply.

16. The self-assisting robot of claim 1 further comprises a power supply of 24 volts.

17. A method of using a self-assisting robot comprising a base, a robotic arm, a kneeling seat connected to and moving with said robotic arm, a saddle, and a controller, comprising: moving said self-assisting robot to a user; upon arrival at the user's location, causing said robotic arm to lean toward said user; leaning on said saddle to control said self-assertive robot; transferring said user from a wheel chair to said kneeling seat; moving said self-assisting robot to a toilet; rotating said platform to orient said user to a desired direction for sitting onto the toilet; and moving said user from said kneeling seat to said toilet.

18. The method of claim 16 further comprising measuring the inclination angle between said platform and the road, generating an alarming sound and stop said self-assisting robot when said inclination angle is greater than a predetermined safe angle.

19. The method of claim 16 wherein said moving said self-assisting robot further comprises remote controlling said self-assisting robot to move toward said user using a first motor and a second motor, wherein said causing said robotic arm to lean toward said user further comprising using a third motor, and wherein said rotating said platform to orient said user to a desired direction further comprising using a fourth motor which further comprises a DC motor and a worm gear.

20. The method of claim 16 further comprising measuring the state of said self-assisting robot whether it is in a resting mode or active mode, if said self-assisting robot is in the restive mode, communicating with said processor to turn off the power supply to said self-assisting robot.

21. The method of claim 16 further comprising measuring the height of said user's seat and lowering or raising said robotic arm and said kneeling seat to the level of said user when said self-assisting robotic is moving toward said user.

\* \* \* \* \*